US011138390B2

(12) United States Patent
Cheng

(10) Patent No.: US 11,138,390 B2
(45) Date of Patent: Oct. 5, 2021

(54) CONCURRENT RECEPTION OF MULTIPLE USER SPEECH INPUT FOR TRANSLATION

(71) Applicant: Google LLC, Mountain View, CA (US)

(72) Inventor: Deric Cheng, San Francisco, CA (US)

(73) Assignee: Google LLC, Mountain View, CA (US)

( * ) Notice: Subject to any disclaimer, the term of this patent is extended or adjusted under 35 U.S.C. 154(b) by 136 days.

(21) Appl. No.: 16/269,207

(22) Filed: Feb. 6, 2019

(65) Prior Publication Data

US 2019/0251176 A1 Aug. 15, 2019

Related U.S. Application Data

(60) Provisional application No. 62/628,421, filed on Feb. 9, 2018.

(51) Int. Cl.
*G06F 15/00* (2006.01)
*G10L 25/00* (2013.01)
(Continued)

(52) U.S. Cl.
CPC .............. *G06F 40/58* (2020.01); *G06F 3/165* (2013.01); *G06F 3/167* (2013.01); *G10L 15/30* (2013.01);
(Continued)

(58) Field of Classification Search
CPC .......... G06F 3/165; G06F 3/167; G06F 40/58; G06F 16/3337; G06F 40/40; G06F 40/42;
(Continued)

(56) References Cited

U.S. PATENT DOCUMENTS 7,707,035 B2 * 4/2010 McCune ................. G10L 15/26
704/270
9,201,865 B2 * 12/2015 Tran ......................... G06F 40/58
(Continued)

FOREIGN PATENT DOCUMENTS

WO 2007080517 A2 7/2007
WO 2016050298 A1 4/2016

OTHER PUBLICATIONS

International Search Report and Written Opinion for PCT Application No. PCT/US2019/016872 dated Apr. 17, 2019. 18 pages.
(Continued)

*Primary Examiner* — Khai N. Nguyen
(74) *Attorney, Agent, or Firm* — Lerner, David, Littenberg, Krumholz & Mentlik, LLP

(57) ABSTRACT

An improved translation experience is provided using an auxiliary device, such as a pair of earbuds, and a wirelessly coupled mobile device. Microphones on both the auxiliary device and the mobile device simultaneously capture input from, respectively, a primary user (e.g., wearing the auxiliary device) and a secondary user (e.g., a foreign language speaker providing speech that the primary user desires to translate). Both microphones continually listen, rather than alternating between the mobile device and the auxiliary device. Each device may determine when to endpoint and send a block of speech for translation, for example based on pauses in the speech. Each device may accordingly send the received speech for translation and output, such that it is provided in a natural flow of communication.

20 Claims, 5 Drawing Sheets

(51) Int. Cl.
*G10L 15/00* (2013.01)
*G10L 15/04* (2013.01)
*G10L 15/18* (2013.01)
*G10L 21/00* (2013.01)
*G06F 40/58* (2020.01)
*G06F 3/16* (2006.01)
*G10L 15/32* (2013.01)
*G10L 15/30* (2013.01)
*H04M 1/60* (2006.01)
*G10L 25/87* (2013.01)

(52) U.S. Cl.
CPC ........... *G10L 15/32* (2013.01); *H04M 1/6066* (2013.01); *G10L 25/87* (2013.01); *H04M 2250/58* (2013.01); *H04M 2250/74* (2013.01)

(58) Field of Classification Search
CPC .......... G06F 40/44; G06F 40/45; G06F 40/47; G06F 40/49; G06F 40/51; G06F 40/53; G06F 40/55; G06F 40/56; G10L 15/30; G10L 15/32; G10L 25/87; H04M 1/6066; H04M 2250/58; H04M 2250/74; H04M 2203/2601; H04M 2242/12; H04M 2260/58
USPC ............................................. 704/2, 5, 8, 277
See application file for complete search history.

(56) References Cited

U.S. PATENT DOCUMENTS

| | | | | |
|---|---|---|---|---|
| 9,535,906 B2* | 1/2017 | Lee | ............ | G06F 3/017 |
| 9,936,278 B1* | 4/2018 | McGary | ............ | H04R 1/1008 |
| 10,079,014 B2* | 9/2018 | Naik | ............ | G10L 15/187 |
| 10,485,049 B1* | 11/2019 | Batta | ............ | H04R 1/1041 |
| 2007/0100637 A1* | 5/2007 | McCune | ............ | G10L 15/26 704/277 |
| 2009/0099836 A1* | 4/2009 | Jacobsen | ............ | G06F 40/58 704/3 |
| 2011/0301952 A1* | 12/2011 | Koshinaka | ............ | H04M 3/493 704/235 |
| 2012/0215519 A1* | 8/2012 | Park | ............ | G10L 21/0208 704/2 |
| 2013/0289971 A1* | 10/2013 | Parkinson | ............ | G06F 40/58 704/2 |
| 2015/0058023 A1* | 2/2015 | Goo | ............ | G10L 15/005 704/277 |
| 2015/0134322 A1* | 5/2015 | Cuthbert | ............ | G06F 40/58 704/3 |
| 2015/0333820 A1* | 11/2015 | Toivanen | ............ | H04B 7/26 455/41.2 |
| 2017/0286407 A1* | 10/2017 | Chochowski | ............ | G10L 15/26 |
| 2018/0090127 A1* | 3/2018 | Hofer | ............ | G10L 25/87 |
| 2018/0260388 A1* | 9/2018 | Huang | ............ | G06F 40/58 |
| 2018/0293974 A1* | 10/2018 | Georges | ............ | G10L 15/183 |
| 2019/0251176 A1* | 8/2019 | Cheng | ............ | G06F 3/167 |
| 2019/0373430 A1* | 12/2019 | Srivatsa | ............ | H04W 76/11 |
| 2020/0194000 A1* | 6/2020 | Xian | ............ | G10L 15/26 |

OTHER PUBLICATIONS

International Preliminary Report on Patentability for PCT Application No. PCT/US2019/016872 dated Aug. 20, 2020. 12 pages.

* cited by examiner

CONCURRENT RECEPTION OF MULTIPLE USER SPEECH INPUT FOR TRANSLATION

CROSS-REFERENCE TO RELATED APPLICATIONS

The present application claims the benefit of the filing date of U.S. Provisional Patent Application No. 62/628,421 filed Feb. 9, 2018, the disclosure of which is hereby incorporated herein by reference.

BACKGROUND

Mobile computing devices, such as mobile phones, have available auxiliary devices which can offer additional functionality. For example, some earbuds offer a translation experience where a user can touch one earbud, speak in a first language, and the spoken phrase is translated into a second language. The user may hear the translated phrase, for example, from speakers in the mobile computing device. Similarly, phrases spoken into the mobile phone in the second language may be translated to the first language and output through the earbuds. This exchange is performed serially, such that each participant must wait for the other's speech to be completed, translated, and output through speakers of the mobile computing device or auxiliary device before speaking a response. The serial nature of the exchange adds significant delays to conversational patterns, and introduces uncomfortable social cues. The interaction flow requires both parties to pay careful attention to which person is speaking, whether the translation is being output on each device, and as a result is unintuitive.

BRIEF SUMMARY

The present disclosure provides for a more natural, conversational exchange between a user and a foreign language speaker using translation features of mobile devices and auxiliary devices. In particular, microphones of both the mobile device and the auxiliary device are always listening for speech input. The mobile and auxiliary device may also determine whether the speech input is from the user or the foreign language speaker. The mobile device and auxiliary device can automatically determine when a spoken phrase is complete and ready for translation, send the spoken phrase for translation, and immediately begin listening again. In this regard, acknowledgements or other social cues, such as "OK," "Yes," "Oh no," etc. may be captured, translated, and output throughout a conversation in response to the other user's translated speech, even if the other user is still speaking.

One aspect of the disclosure provides a system for providing translations, including an auxiliary device and a mobile computing device wirelessly coupled to the auxiliary device. The auxiliary device includes a microphone configured to continually listen for first input from a first user, and a communication interface adapted to transmit the first input. The mobile computing device, includes a mobile computing device microphone configured to continually listen for second input from a second user while the auxiliary device microphone listens for the first input from the first user, a communication interface adapted to receive the first input from the auxiliary device and to transmit information to the auxiliary device, one or more processors adapted to process the first input and the second input, and an output adapted to provide at least one of the processed first input or the processed second input.

The auxiliary device and the mobile device may be wirelessly coupled using two independent wireless communication channels, including a first channel used for transmission from the auxiliary device to the mobile device, and a second channel used for transmission from the mobile device to the auxiliary device. The first channel and the second channel may be different types. For example, the first channel may be an RFComm channel, and the second channel may be an A2DP channel. According to some examples, either or both of the auxiliary device and the mobile device may be configured to automatically determine an endpoint in received speech, and immediately continue listening for subsequent speech after the endpoint. Either or both devices may be further configured, in some examples, to determine which of the first user or the second user is providing input. For example, the devices may include a speaker recognition unit configured to determine at least one of a voice or a language spoken. In some examples, one or more processors of the mobile device are further configured to cross reference a volume level of input received through the auxiliary device microphone with a volume level of input received through the mobile computing device microphone. In other examples, one or more processors of the mobile device are further configured to cross reference waveforms of speech input received through the auxiliary device microphone with waveforms of speech input received through the mobile computing device microphone.

Another aspect of the disclosure provides an auxiliary device, such as an earbud, including a microphone, a communication interface configured to wirelessly communicate with a computing device, an output source, and one or more processors in communication with the microphone, the communication interface, and the output source. The one or more processors may be configured to receive, through the microphone, first input from a first user, detect an endpoint in the first input, receive subsequent input from the first user after the endpoint, and send, through the communication interface, the first input up to the endpoint to the computing device, while receiving the subsequent input. According to some examples, the one or more processors may be further configured to receive, from the computing device, translated speech from a second user, and output, through the output source, the translated speech. The communication interface may be configured to communicate with the computing device using two independent wireless communication channels, including a first channel used for transmitting information to the computing device, and a second channel of a different type than the first channel used for receiving information from the computing device.

Yet another aspect of the disclosure provides a mobile computing device, such as a mobile phone, including a microphone, a communication interface configured to wirelessly communicate with an electronic accessory, an output source, and one or more processors. The one or more processors may be configured to, receive, through the microphone, first voice input, detect an endpoint in the first voice input, translate the received first input up to the endpoint, listen for subsequent input while translating, and transmit the translated first input to the electronic accessory for output. In some examples, the one or more processors are configured to distinguish first voice input from the first user from second voice input from a second user. For example, a speaker recognition unit may be configured to determine at least one of a voice or a language spoken. According to other examples, the one or more processors are further configured to receive, from the electronic accessory, second input, and cross reference a volume level of the second input with a volume level of the first input, or cross reference waveforms of the second input with waveforms of the first input.

DETAILED DESCRIPTION

The present disclosure provides for an improved translation experience between a first user and a second user using a mobile computing device and an auxiliary device, such as a pair of earbuds. The first user may be, for example, a foreign language speaker, and the second user may be the owner of the mobile computing device and auxiliary device. Microphones on both the mobile device and the auxiliary device simultaneously capture input from the first user and the second user, respectively, rather than alternating between the mobile device and the auxiliary device. Each device may determine when to endpoint, or send a block of speech for translation, for example based on pauses in the speech. Each device may accordingly send the received speech up to the endpoint for translation and output, such that it is provided in a natural flow of communication. Listening by the microphones automatically resumes immediately after endpointing, and therefore speech will not be lost.

Example Systems

Figure 1:
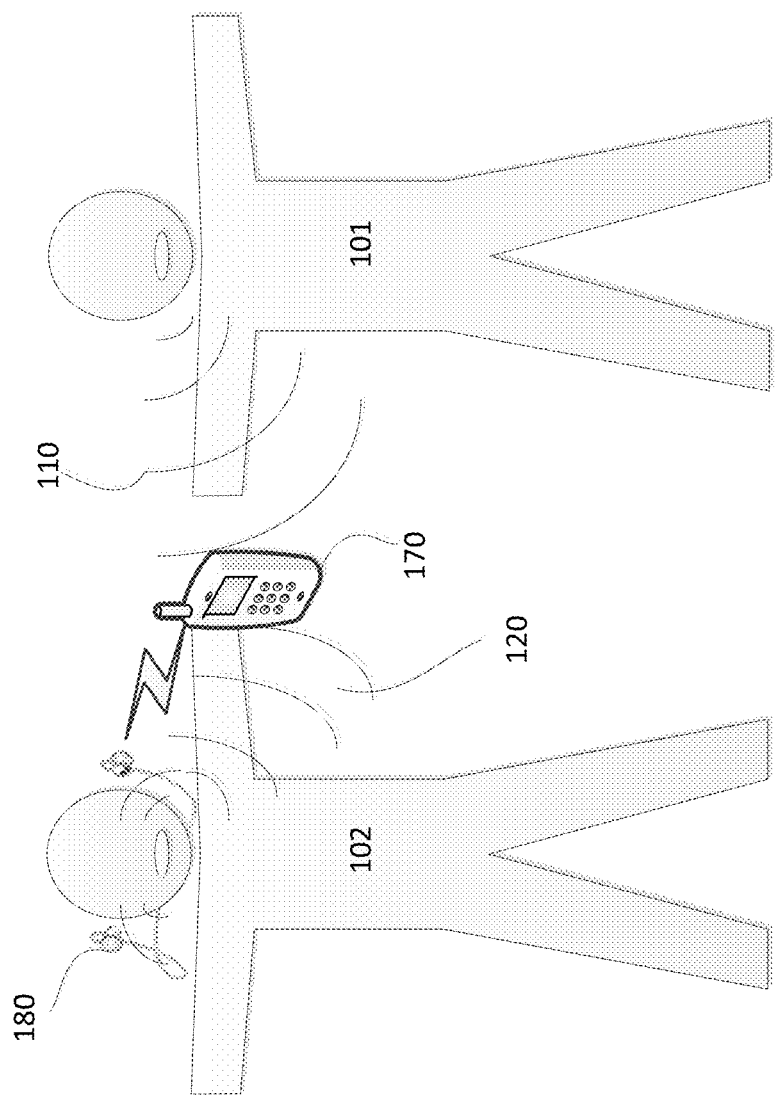
FIG. 1 is a pictorial diagram of an example system in use by two users according to aspects of the disclosure.

FIG. 1 is a pictorial diagram of an example system in use. A first user 101 provides speech input 110. The speech input 110 may be in a language foreign to a second user 102. The speech input 110 is received at a mobile computing device 170 of the second user 102. The second user 102 also provides second speech input 120 in a second language. The second speech input 120 may be received by both the mobile device 170 and by an auxiliary device 180 worn by the second user 102. According to some examples, the auxiliary device 180 may be intended to primarily receive the second speech input 120, while the mobile device 170 is intended to primarily receive the first speech input 110. However, even in this example, the mobile device 170 may also pick up some of the second speech input 120 as a side effect, and may filter out the second speech input 120. For example, the mobile device 170 may determine which input is received from the first user 101 and which input is received from the second user 102, and translate the speech from the first user 101. The auxiliary device 180 may also determine that received input is from the second user 102, and send that input to the mobile device for translation. Each of the mobile device 170 and the auxiliary device 180 remains listening throughout an exchange between the first user 101 and the second user 102, and provides translated output at times relevant to one another.

In the example shown, the auxiliary device 180 is a pair of wireless earbuds. However, it should be understood that the auxiliary device 180 may be any of a number of different types of auxiliary devices. For example, the auxiliary device 180 may be a pair of wired earbuds, a headset, a head-mounted display, a smart watch, a mobile assistant, etc.

The mobile computing device 170 may be, for example, a mobile phone, tablet, laptop, gaming system, or any other type of mobile computing device. In some examples, the mobile computing device 170 may be coupled to a network, such as a cellular network, wireless Internet network, etc. Translations capabilities may be stored on the mobile computing device 170, or accessed from a remote source by the mobile computing device 170. For example, the mobile device 170 may interface with a cloud computing environment in which the speech translations from a first language to a second language are performed and provided back to the mobile device 170.

Figure 2:
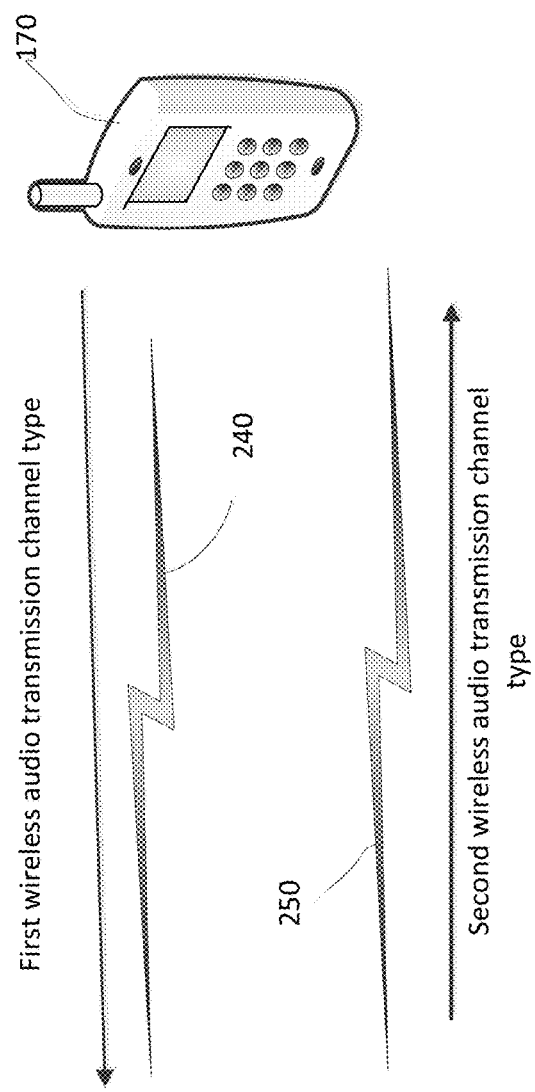
FIG. 2 is pictorial diagram of the example system of FIG. 1.
Figure 2:
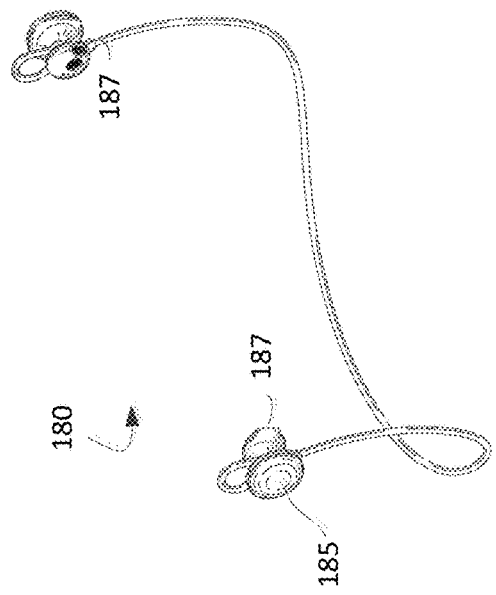

FIG. 2 is pictorial diagram of the example system including auxiliary device 180 and mobile device 170, and illustrates an exchange of signals between the mobile device 170 and the auxiliary device 180.

In this example, the auxiliary device 180 is illustrated as a pair of earbuds, which may include, for example, speaker portion 187 adjacent an inner ear-engaging surface 188, and input portion 185 adjacent an outer surface. In some examples, a user may enter input by pressing the input portion 185 while speaking, or by tapping the input portion 185 prior to speaking. In other examples, manual input by a user is not required, and the user may simply begin speaking. The user's speech may be received by a microphone in the earbuds (not shown) or in the mobile device 170. The user may hear translated speech from another person through the speaker portion 187.

The auxiliary device 180 is wirelessly coupled to the mobile device 170. The wireless connections between the devices may include, for example, a short range pairing connection, such as Bluetooth. Other types of wireless connections are also possible.

In some examples, such as shown in FIG. 2, different wireless protocols may be used for transmission of information from the earbuds 180 to the mobile device 170, than for transmission of information in a reverse path from the mobile device 170 to the earbuds 180. Wireless pairing between mobile and auxiliary devices may typically use an HFP/SCO channel, which provides for lower quality two-way communication. The present example provides for replacing the HFP/SCO channel with two concurrent channels. In some examples, the concurrent channels may be of different types. A first channel 240, used for transmitting information from the mobile device 170 to the auxiliary device 180, may be a high quality one-way audio channel, such as A2DP. A second channel 250, used for transmitting information from the auxiliary device 180 to the mobile device 170, may be, for example, an RFComm channel. This allows for the mobile device 170 to process two streams of input audio at once. In this regard, microphones on both the mobile device 170 and auxiliary device 180 may be used concurrently, with audio transmitted simultaneously in both directions. It should be understood that A2DP and RFComm are merely examples of the different types of channels that can be used. Moreover, in some examples the channels 240, 250 may be independent channels of a same type, each providing one-way communication.

Figure 3:
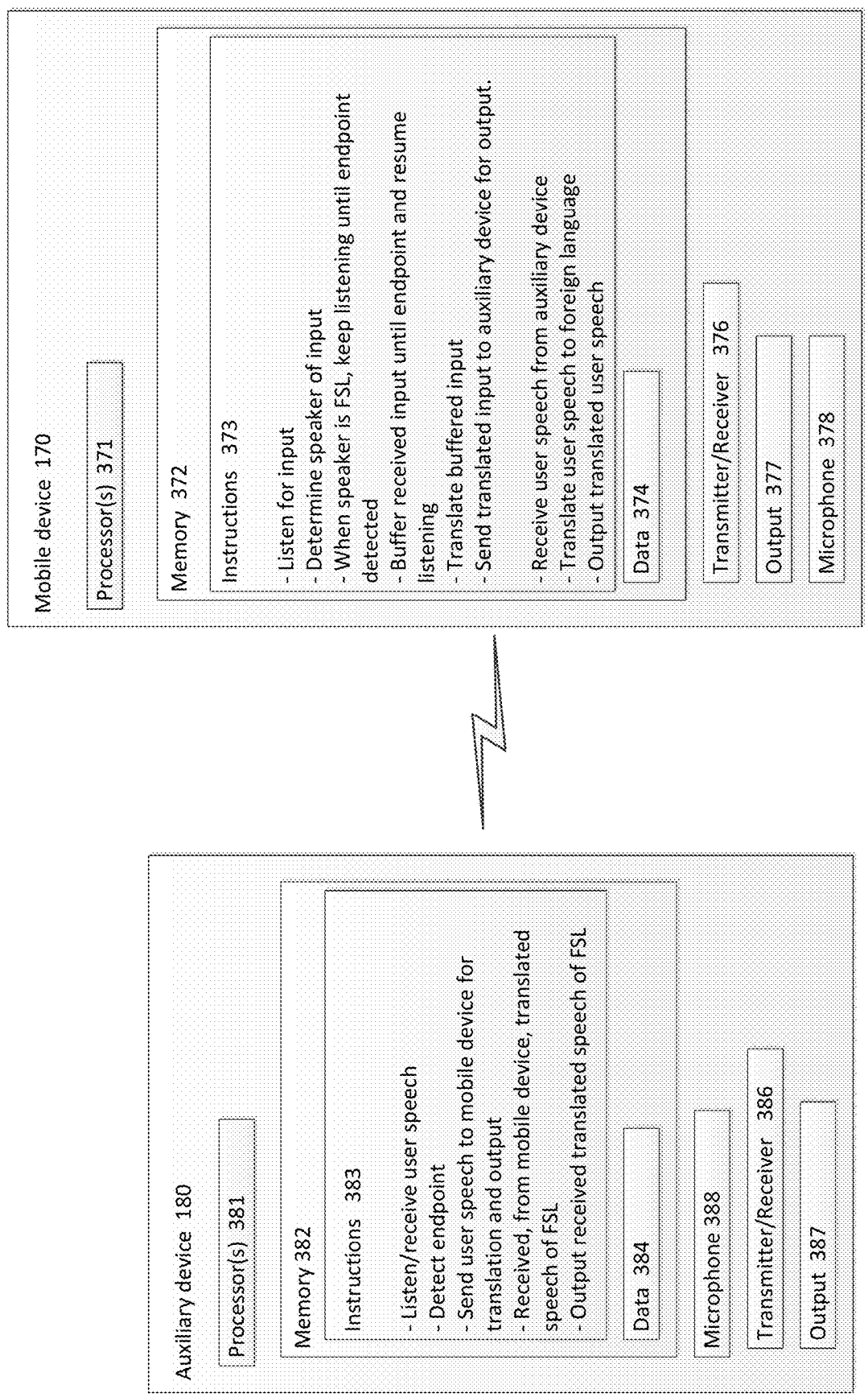
FIG. 3 is a block diagram illustrating components of the example system of FIG. 1.

FIG. 3 provides an example block diagram of the auxiliary device 180 and the mobile device 170. Each device includes one or more processors 371, 381, memory 372, 382, and other components typically present in mobile computing devices and auxiliary devices. While a number of components are shown, it should be understood that such components are merely non-limiting examples, and that other components may additionally or alternatively be included.

As mentioned above, the auxiliary device 180 can be any of various types of devices, such as earbuds, head-mounted device, smart watch, etc. The mobile device 170 can also take a variety of forms, such as smart phone, tablet, laptop, game console, etc.

The one or more processors 371, 381 may be any conventional processors, such as commercially available microprocessors. Alternatively, the one or more processors may be a dedicated device such as an application specific integrated circuit (ASIC) or other hardware-based processor. Although FIG. 3 functionally illustrates the processor, memory, and other elements of auxiliary device 180 and mobile computing device 170 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the auxiliary device 180 or mobile computing device 170. Accordingly, references to a processor or computing device will be understood to include references to a collection of processors or computing devices or memories that may or may not operate in parallel.

Memory 382 may store information that is accessible by the processors 381, including instructions 383 that may be executed by the processors 381, and data 384. The memory 382 may be of a type of memory operative to store information accessible by the processors 381, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 383 and data 384 are stored on different types of media.

Data 384 may be retrieved, stored or modified by processors 381 in accordance with the instructions 383. For instance, although the present disclosure is not limited by a particular data structure, the data 384 may be stored in computer registers, in a relational database as a table having a plurality of different fields and records, XML documents, or flat files. The data 384 may also be formatted in a computer-readable format such as, but not limited to, binary values, ASCII or Unicode. By further way of example only, the data 384 may be stored as bitmaps comprised of pixels that are stored in compressed or uncompressed, or various image formats (e.g., JPEG), vector-based formats (e.g., SVG) or computer instructions for drawing graphics. Moreover, the data 384 may comprise information sufficient to identify the relevant information, such as numbers, descriptive text, proprietary codes, pointers, references to data stored in other memories (including other network locations) or information that is used by a function to calculate the relevant data.

The instructions 383 may be executed to facilitate translations performed by a mobile computing device. For example, the instructions 383 provide for listening for and receiving user speech, for example, through microphone 388. The microphone 388 may be beamformed, such that it is directed to receive audio coming from a direction of the user's mouth. In this regard, the auxiliary device 180 may recognize received speech as being that of the user, as opposed to a foreign language speaker that is not wearing the auxiliary device 180.

The instructions 383 may further provide for detecting an endpoint in the received speech. For example, the endpoint may be automatically determined based on a pause in speech, key words, intonation, inflection, or any of a combination of these or other factors. Once the endpoint is detected, the auxiliary device 180 may buffer the received speech while immediately resuming listening. In other examples, alternatively or additionally to buffering, the auxiliary device 180 may transmit the received speech to the mobile device 170 for translation. For example, the auxiliary device 180 may transmit the speech via an RFComm or other communication link, as discussed above in connection with FIG. 2. In some examples, all endpointing may be performed by the mobile device 170. In such examples, the auxiliary device 180 may stream all audio to the mobile device 170, which handles all endpointing, voice recognition, and translation, either offline or online.

While the auxiliary device 180 is executing the instructions 383, the mobile device 170 may also be executing instructions 373 stored in memory 372 along with data 374. For example, similar to the auxiliary device 180, the mobile device 170 may also include memory 372 storing data 374 and instructions 373 executable by the one or more processors 371. The memory 372 may be any of a variety of types, and the data 374 may be any of a variety of formats, similar to the memory 382 and data 384 of the auxiliary device 180. While the auxiliary device 180 is listening for and receiving speech from the user wearing the auxiliary device 180, the mobile device 170 may be listening for and receiving speech as well through microphone 378. The microphone 378 may not be beamformed, and may receive audio input from both the foreign language speaker (e.g., first user 101 of FIG. 1) and the user of the auxiliary device 180 (e.g., second user 102 of FIG. 1). Accordingly, the instructions 373 may provide for determining which user is providing speech input, such that some speech input (e.g., from the foreign language speaker) can be translated for output through the auxiliary device 180 and other speech input (e.g., from the user) can be filtered.

Any of a variety of voice recognition techniques may be used. As one example, the mobile device 170 may cross reference a volume level between the auxiliary device microphone 388 and the mobile device microphone 378. If the sound received through microphone 388 is quiet and the sounds received through the microphone 378 is loud, then it may be determined that the foreign language speaker is providing speech input. Conversely, if the sounds received through both microphones 388, 378 is loud, then it may be determined that the owner/user is speaking. As another example technique, a voice recognition unit may be used. The voice recognition unit may be trained to recognize a voice of the user/owner of the auxiliary device 180 and mobile device 170. Accordingly, if the voice recognition unit detects the owner's voice, it may ignore it. Similarly, the voice recognition unit may be trained to detect a language primarily spoken by the owner/user, and may filter out speech detected in that language. As yet another example technique, audio echo cancellation techniques may be used. For example, the mobile device 170 may listen to both microphone 388, 378, detect overlapping audio, and, recognize that the overlapping audio belongs to the owner. The overlapping audio may be detected by identifying similar waveforms or patterns of sound input, or detecting similar plosives or transient attacks. In some examples, any combination of the foregoing or other techniques may be used.

When the detected speech is from the foreign language speaker, the instructions 373 may further provide for continued listening until an endpoint is detected. As mentioned above, the endpoint may be detected based on a pause, keyword, inflection, or other factor. The received speech from the foreign language speaker is buffered, and the microphone 378 resumes listening.

The mobile device 170 may perform translations of both foreign language speaker input received through the microphone 378, as well as owner input received through communication from the auxiliary device 180. Such translations may be performed on the mobile device 170 itself, or may be performed using one or more remote computing devices, such as the cloud. For example, the mobile device 170 may upload speech for translation to a remote computing network which performs the translation, and receive a response including translated speech from the remote computing network. Translations of speech from the foreign language speaker may be provided to the auxiliary device 180 for output through output 387. Translations of speech from the owner may be output through output 377 of mobile device 170. The outputs 377, 387 may each include, for example, one or more speakers adapted to provide audible output. In some examples, the outputs 377, 387 may also include one or more other types, such as displays, tactile feedback, etc.

It should be understood that the auxiliary device 180 and mobile device 170 may each include other components which are not shown, such charging input for the battery, signals processing components, etc. Such components may also be utilized in execution of the instructions 383, 373.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
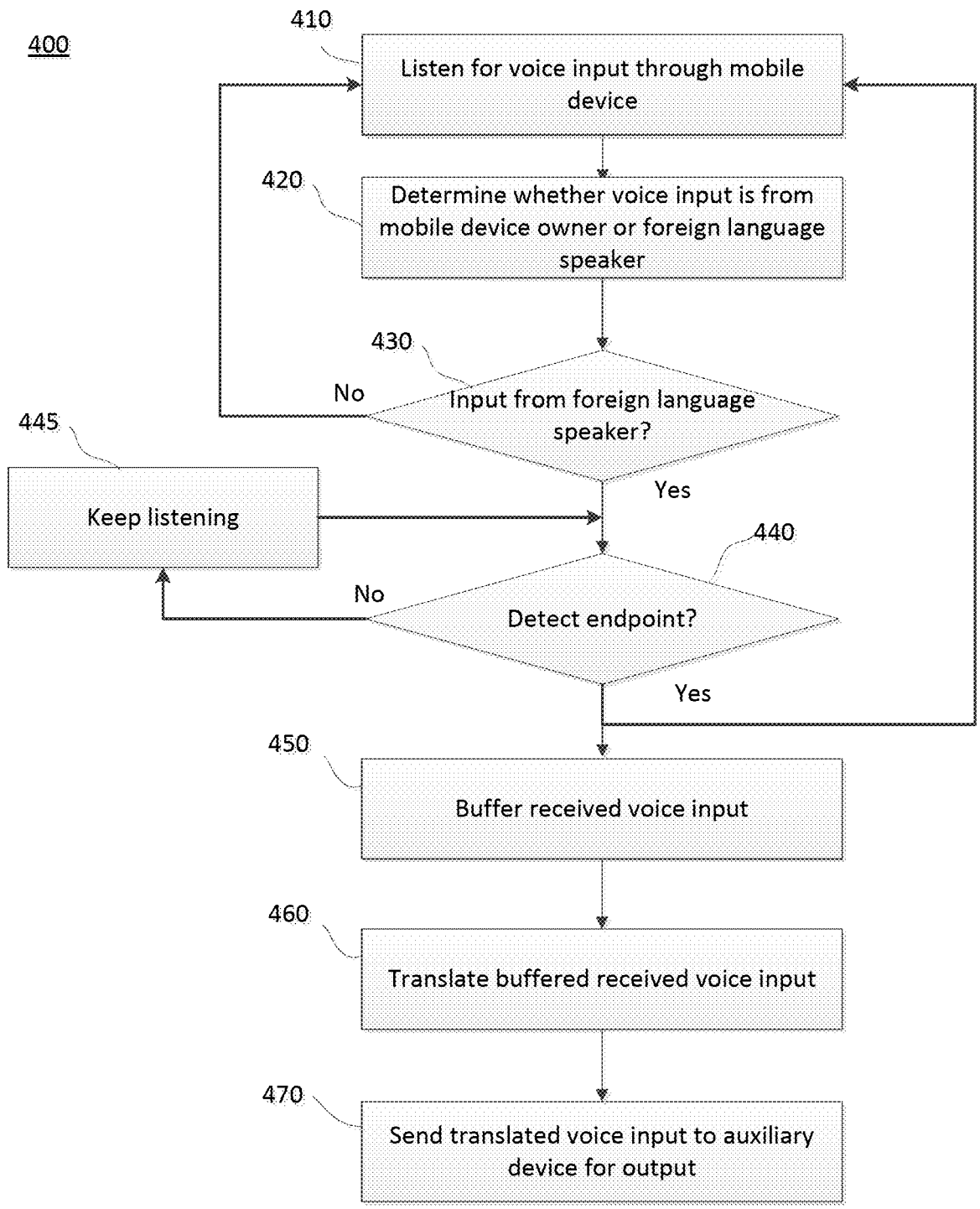
FIG. 4 is a flow diagram illustrating an example method in accordance with aspects of the disclosure.

FIG. 4 illustrates a method 400 executed by the mobile device 170. In block 410, the mobile device listens for and receives voice input. While the mobile device is intended to capture the voice of a secondary user, such as a foreign language speaker (e.g., user 101 of FIG. 1), it may also capture voice input of a primary user (e.g., user 102 of FIG. 1). The device may continually listen for and receive input without manual interaction, such as pressing buttons, etc.

In block 420, the mobile device determines whether the received voice input is from the mobile device owner or the foreign language speaker. For example, the mobile device may use voice recognition, language recognition, etc. As another example, the mobile device may cross reference a volume of sound received at the mobile device with a volume of sound received at the auxiliary device and relayed to the mobile device.

If in block 430 it is determined that the input is from the mobile device owner, the mobile device may ignore the input. Accordingly, the method returns to block 410 to keep listening for input from the foreign language speaker. If, however, the input is determined to be from the foreign language speaker, the method proceeds to block 440.

In block 440, the mobile device determines whether an endpoint in speech is detected. For example, if there is a pause in the speech input for a predetermined period of time, such as half a second, one second, two seconds, etc., the mobile device may determine that an endpoint in speech has been reached. Other examples of detecting endpoints may include detecting changes in intonation or inflection, or detecting keywords. Detecting the endpoint helps to ensure proper translation of complete phrases. For example, translations of each individual word are typically inaccurate. By way of example only, while in English adjectives are typically spoken before their associated nouns, in Spanish the adjectives are spoken after the noun. By endpointing the speech after a complete statement, phrases may be translated as a whole and the words rearranged as appropriate for the translated language.

If no endpoint is detected, the mobile device keeps listening in block 445 and waiting for an endpoint. If an endpoint is detected, however, the mobile device buffers the received input in block 450. It should be understood that the buffering may be performed while the input is received, prior to detection of the endpoint.

In block 460, the mobile device translates the buffered voice input up until the endpoint. The translation may be performed at the mobile device, or through remote computing devices.

In block 470, the translated input is provided to the auxiliary device for output. For example, the translated input may be provided through one of the two communication channels described in FIG. 2.

Though not shown, the mobile device also receives speech from the auxiliary device. For example, the auxiliary device receives speech from the owner as described below in connection with FIG. 5, and provides the received speech to the mobile device for translation. Once translated, the mobile device may output the translated speech for the foreign language speaker. For example, the mobile device may emit an audible translation of the speech through a speaker for the foreign language speaker to hear, may provide a text translation of the speech on a display, etc.

Figure 5:
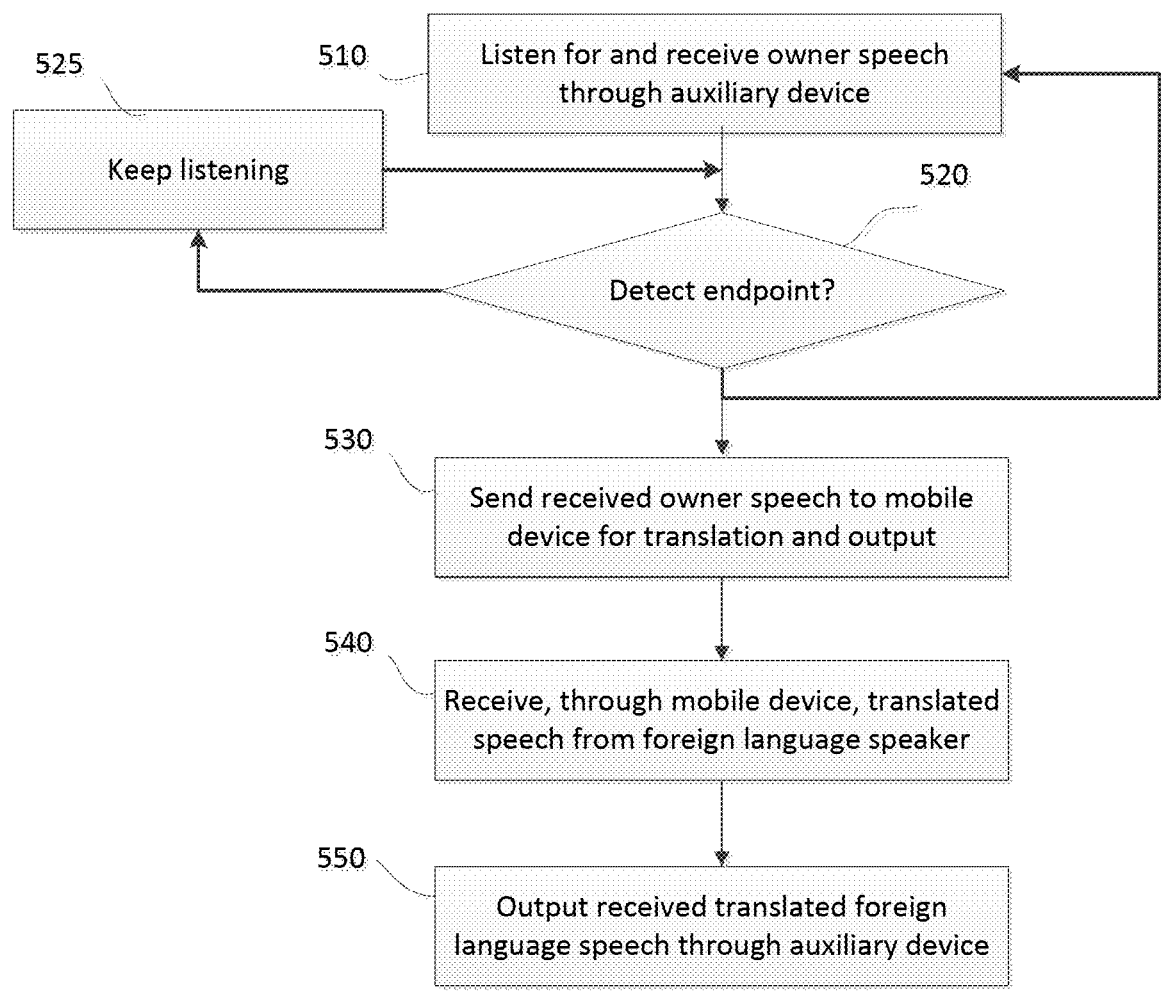
FIG. 5 is a flow diagram illustrating another example method in accordance with aspects of the disclosure.

FIG. 5 illustrates a method 500 performed by the auxiliary device for receiving translation. The method 500 may be performed by the auxiliary device contemporaneously with execution of the method 400 by the mobile device.

In block 510, the auxiliary device listens for and receives voice input from the owner. Where a microphone in the auxiliary device is beamformed, it may determine that any input received is from the owner. In other examples, voice recognition techniques such as those described above may be used.

In block 520, the auxiliary device determines whether an endpoint was reached. The endpoint may be automatically detected based on patterns in the speech. In other examples, the endpoint may be manually input by the owner, such as by pressing a button. If no endpoint is detected, the device continues listening in block 525 until an endpoint is detected. The received speech may be buffered at the auxiliary device during and/or after receipt. In some alternatives, rather than endpointing being performed by the auxiliary device, the auxiliary device streams the received audio continuously to the mobile device. The mobile device may run two voice recognizers simultaneously in order to detect voice and endpoint accordingly.

In block 530, the received speech from the owner is transmitted to the mobile device for translation and output. For example, the speech may be sent through a second communication channel, as discussed above in connection with FIG. 2. This speech may be sent concurrently with speech received (block 540) from the mobile device for output (block 550) by the auxiliary device.

By keeping microphones on both the auxiliary device and the mobile device continually open, speech from both the owner and the foreign language speaker is continually received. In this regard, the owner and foreign language speaker may have a more natural conversation, including interjections, affirmations, acknowledgements, etc., and without awkward pauses while waiting for translation. By automatic endpointing, phrases or other blocks of speech may be detected and translated without requiring manual input from a user. Moreover, voice recognition techniques may be used to determine which user is providing the input and thus how it should be translated. Accordingly, less user manipulation of devices is required. Rather, the users may converse naturally, and the auxiliary and mobile devices may automatically provide assistance, providing for a near real-time translation.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for providing translations, comprising:
an auxiliary device, comprising:
   an auxiliary device microphone configured to continually listen for first speech input from a first user; and
   an auxiliary device communication interface configured to transmit the first speech input;
a mobile computing device wirelessly coupled to the auxiliary device, the mobile computing device comprising:
   a mobile computing device microphone configured to continually listen for second speech input from a second user while the auxiliary device microphone listens for the first speech input from the first user;
   a mobile computing device communication interface configured to receive the first speech input from the auxiliary device and to transmit information to the auxiliary device;
   one or more processors configured to detect an endpoint in at least the second speech input based on natural language, and process the first speech input and the second speech input; and
   an output adapted to provide at least one of the processed first speech input or the processed second speech input, wherein the processed first or second speech input is a translated version of the first or second speech input.

2. The system of claim 1, wherein the auxiliary device and the mobile computing device are wirelessly coupled using two independent wireless communication channels, including a first channel used for transmission from the auxiliary device to the mobile computing device, and a second channel used for transmission from the mobile computing device to the auxiliary device.

3. The system of claim 2, wherein the first channel and the second channel are different types.

4. The system of claim 3, wherein the first channel is a Radio Frequency Communication ("RFComm") channel, and the second channel is an Advanced Audio Distribution Profile ("A2DP") channel.

5. The system of claim 1, wherein the auxiliary device further comprises one or more auxiliary device processors configured to automatically determine an endpoint in the received first speech input based on the natural language of the first speech input.

6. The system of claim 1, wherein the one or more processors of the mobile computing device are further configured to automatically determine an endpoint in the received first speech input based on the natural language of the first speech input.

7. The system of claim 6, wherein the mobile computing device microphone is configured to continue listening immediately after the determined endpoint.

8. The system of claim 1, wherein the one or more processors of the mobile computing device are configured to determine which of the first user or the second user is providing input.

9. The system of claim 8, wherein the mobile computing device further comprises a speaker recognition unit configured to determine at least one of a voice or a language spoken.

10. The system of claim 8, wherein the one or more processors of the mobile computing device are further configured to cross reference a volume level of input received through the auxiliary device microphone with a volume level of input received through the mobile computing device microphone.

11. The system of claim 8, wherein the one or more processors of the mobile computing device are further configured to cross reference waveforms of speech input received through the auxiliary device microphone with waveforms of speech input received through the mobile computing device microphone.

12. An auxiliary device, comprising:
a microphone;
a communication interface configured to wirelessly communicate with a computing device;
an output source; and
one or more processors in communication with the microphone, the communication interface, and the output source, the one or more processors configured to:
   receive, through the microphone, first speech input from a first user;
   detect an endpoint in the first speech input based on natural language of the first speech input;
   receive subsequent speech input from the first user immediately after the endpoint; and
   send, through the communication interface, the first speech input up to the endpoint to the computing device, while receiving the subsequent speech input.

13. The auxiliary device of claim 12, wherein the one or more processors are further configured to:
   receive, from the computing device, translated speech from a second user; and
   output, through the output source, the translated speech.

14. The auxiliary device of claim 12, wherein the auxiliary device comprises an earbud.

15. The auxiliary device of claim 12, wherein the communication interface is configured to communicate with the computing device using two independent wireless communication channels, including a first channel used for transmitting information to the computing device, and a second channel of a different type than the first channel used for receiving information from the computing device.

16. A mobile computing device, comprising:
a microphone;
a communication interface configured to wirelessly communicate with an electronic accessory;
an output source; and
one or more processors configured to:
- receive, through the microphone, first voice input;
- detect an endpoint in the first voice input based on natural language of the first voice input;
- translate the received first voice input up to the detected endpoint;
- listen for subsequent input while translating the received first voice input; and
- transmit the translated first input to the electronic accessory for output.

17. The mobile computing device of claim 16, wherein the one or more processors are configured to distinguish first voice input from a first user from second voice input from a second user.

18. The mobile computing device of claim 17, further comprising a speaker recognition unit configured to determine at least one of a voice or a language spoken.

19. The mobile computing device of claim 17, wherein the one or more processors are further configured to:
- receive, from the electronic accessory, second input; and
- cross reference a volume level of the second input with a volume level of the first input.

20. The mobile computing device of claim 17, wherein the one or more processors are further configured to:
- receive, from the electronic accessory, second input; and
- cross reference waveforms of the second input with waveforms of the first input.

\* \* \* \* \*